United States Patent [19]

Sage et al.

[11] 4,101,061
[45] Jul. 18, 1978

[54] ADJUSTABLE CAR TOP CARRIER SUPPORT

[75] Inventors: Howard M. Sage, Phoenix; John C. Abromavage, Tempe, both of Ariz.

[73] Assignee: U-Haul International, Inc., Phoenix, Ariz.

[21] Appl. No.: 794,900

[22] Filed: May 9, 1977

[51] Int. Cl.² .............................................. B60R 9/04
[52] U.S. Cl. .............................. 224/42.1 F; 24/263 A; 64/29; 248/226.1
[58] Field of Search ............... 224/42.1 F, 42.1 G, 224/42.1 R; 269/244; 254/67; 294/81 R; 248/228, 226.1; 81/52.4 R, 52.4 A; 64/29; 24/263 A

[56] References Cited

U.S. PATENT DOCUMENTS

| | | | |
|---|---|---|---|
| 1,173,316 | 2/1916 | Segal | 81/52.4 R |
| 2,720,350 | 10/1955 | Felton | 224/42.1 F |
| 3,002,726 | 10/1961 | Ford | 254/67 |
| 3,897,895 | 8/1975 | Read | 224/42.1 F |

Primary Examiner—Trygve M. Blix
Assistant Examiner—Reinhard J. Eisenzopf
Attorney, Agent, or Firm—David H. Semmes; Warren E. Olsen

[57] ABSTRACT

An adjustable car top carrier support which is operable for use on a gutterless car top including ledges at its opposite sides. In one embodiment, the carrier support is significantly characterized by having a clutch upon a crankshaft, for limiting the amount of the contractive force which may be applied by the carrier upon the car top. The adjustable car top carrier is further characterized by car top engaging combination which includes a pivotable foot pad, together with a ledge hook for ensuring that the contractive forces of the carrier are inserted into the vicinity of the opposite ledges of a car top. The present invention is particularly useful on a gutterless car top, though may be employed upon any form of a vehicle roof member that conventionally includes a ledge on opposite sides thereof.

31 Claims, 18 Drawing Figures

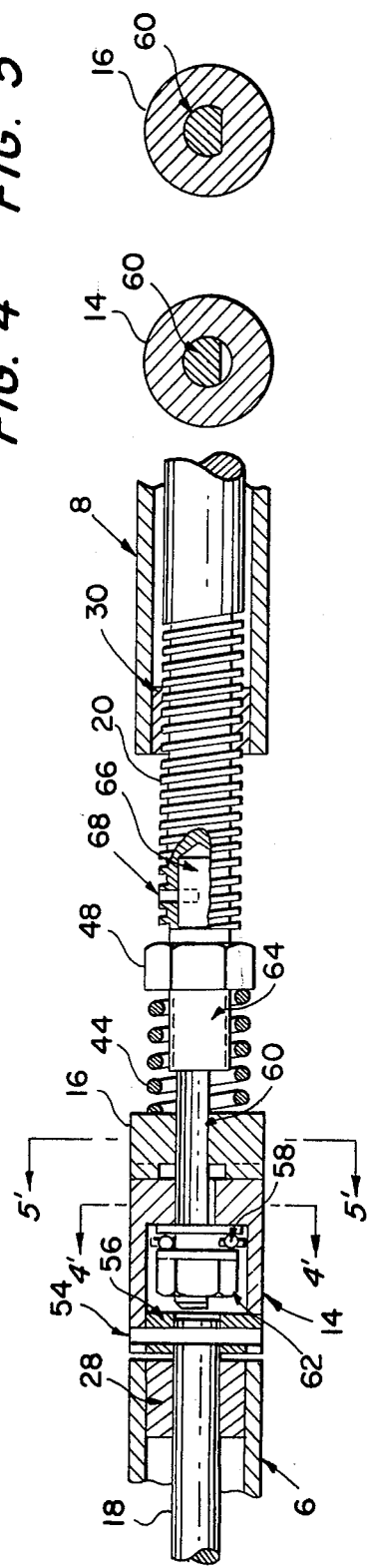
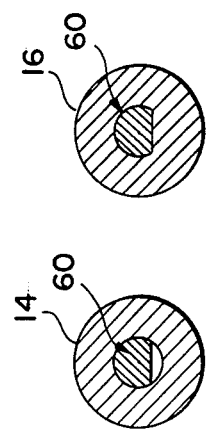
FIG. 3
FIG. 4  FIG. 5

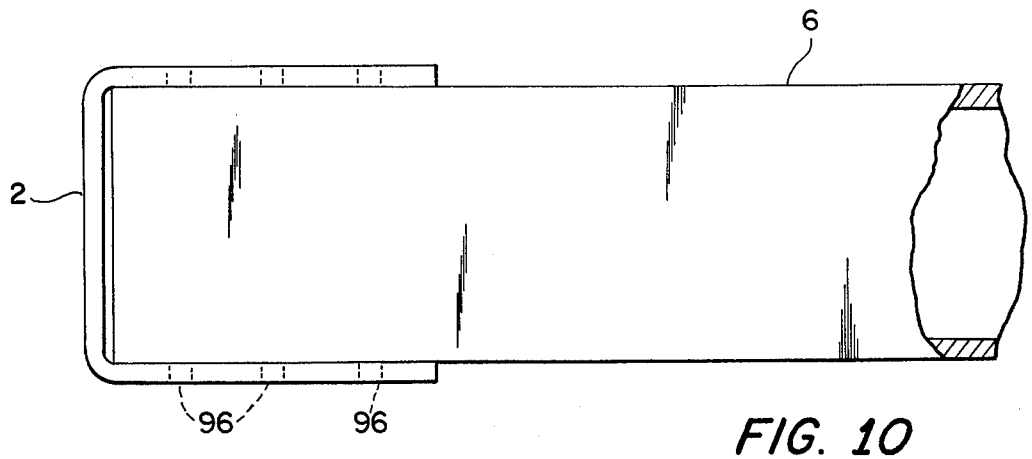
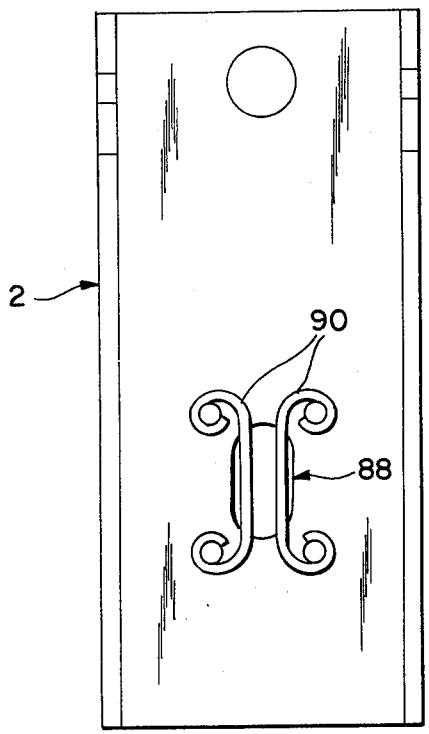
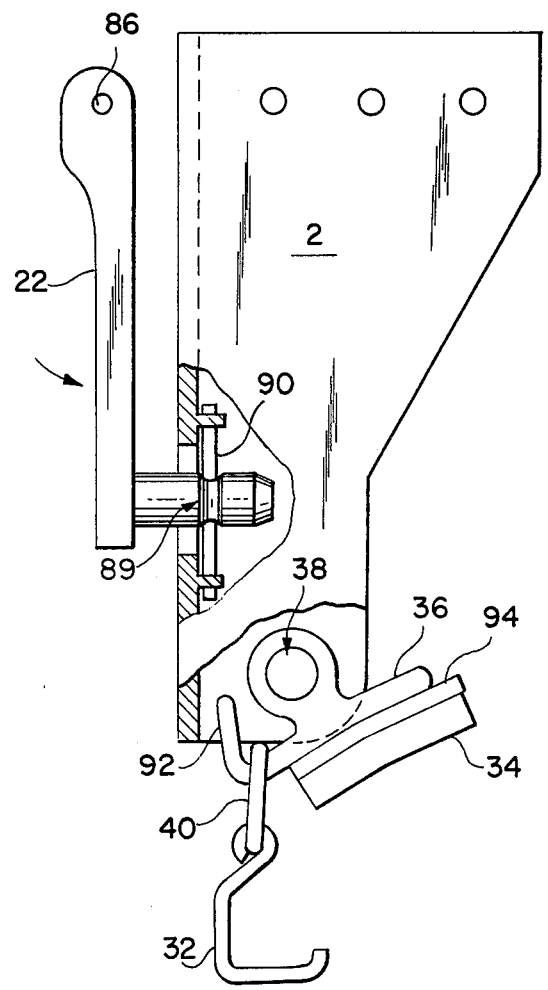

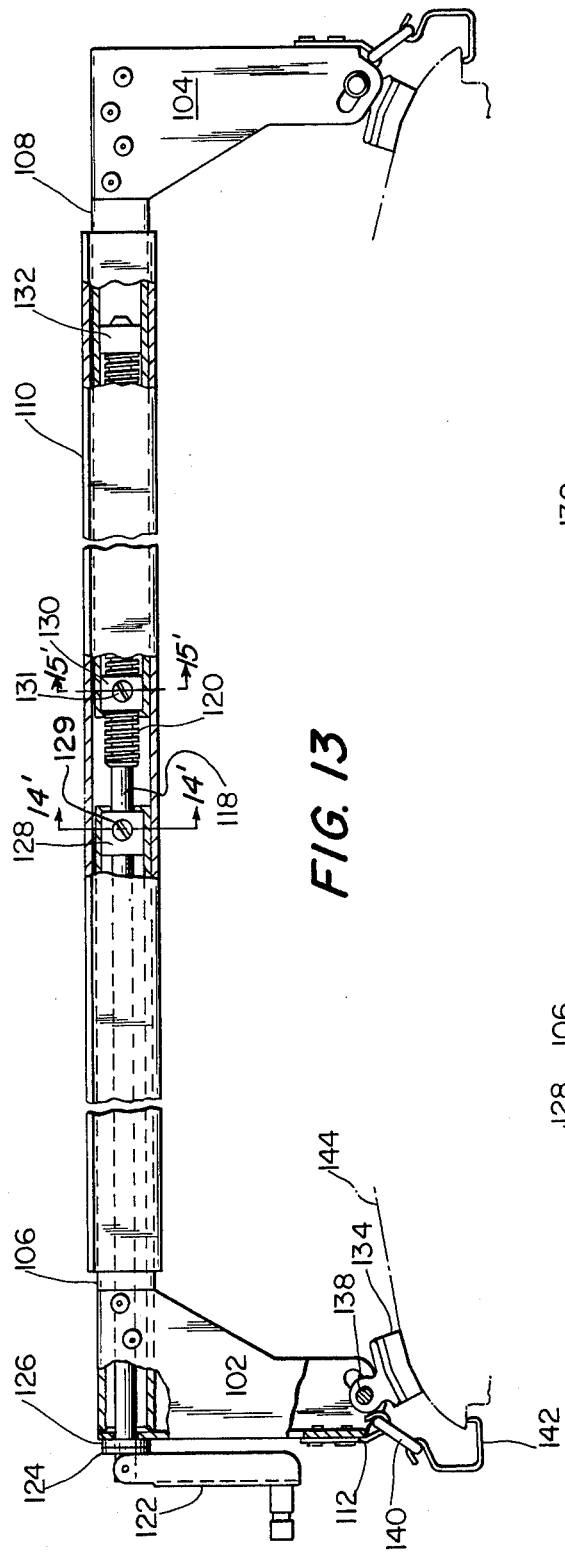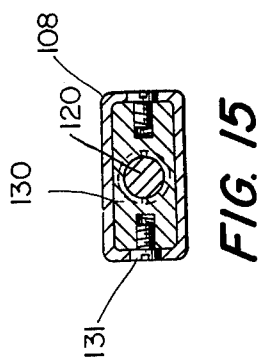

ADJUSTABLE CAR TOP CARRIER SUPPORT

BACKGROUND OF THE INVENTION

1. Field of the Invention

The present invention relates to a car top carrier, and particularly one that is automatically adjustable to apply a predetermined level of contractive force for mounting on any car top. The preferred embodiment of the support includes a torque limiting device in combination with the crankshaft means, so that only a predetermined contractive force may be exerted by the carrier, upon the car top. The present invention may be used as a mounting for any form of car top carrier, including a superposed container adapted for additional carrying space. The present support is further useful as an auxillary carrying rack, for supporting any number of articles necessarily carried external to a vehicle.

2. Description of the Prior Art

Numerous car top constructions are known in the prior art, but none which allow for an automatic preselection of the contractive forces exerted by the engaging means onto the car top. Additionally, there is not found a car top carrier support characterized by support tubes telescoping within a carrier track, wherein the car top engaging means are fixed upon vertical support legs located proximate the outer ends of each tube. Representative of the prior art are the following U.S. Pat. Nos.: BINDING, 3,899,111; READ, 3,897,895; CARSON, 3,877,624; OLIVEIRA, 3,495,750; OLSON, 2,888,178; BARRECA, 2,833,453; GALLAGHER, 2,788,929; STRAUSS, 2,222,636.

The patent to Binding illustrates a car top carrier which is usable with a gutterless car top, and includes a spring mounted clamping linkage having a hook to engage a ledge on either side of the gutterless car top. As such, the patent to Binding shows a car top carrier tensioned upon an automobile roof, but without provision for automatically controlling the amount of tension between the carrier and the vehicle roof, or locating the support legs at the roof edge.

The patent to Read illustrates a car top carrier wherein tensioning of the carrier on the roof is accomplished by separately engaging a jamming mechanism. Read does not illustrate automatic positioning of the feet of the carrier proximate the strongest part of the vehicle roof, and further does not provide for an automatic limiting of applied tension. The patent to Carson illustrates a conventionally mounted car top carrier, with a clamping assembly for holding various objects onto the rack. As such, Carson does not provide for telescoping support tubes for tensioning with respect to the vehicle roof. The patent to Oliveira illustrates a collapsible luggage rack wherein the support feet are manually positioned on the vehicle roof. The amount of tension exerted by the mounting pads on the roof is controlled by the tension of a separate spring, passing through the interior of the main support. Oliveira teaches another collapsible luggage rack that is without provision for supplying a pre-selected mounting force through a telescoping, car top edge engaging means.

The patent to Olson employs a support bar of constant length, with only the tension of the roof mounting hooks controllable through the provision of a wind-up reel, together with a pawl. Olson has no provision for maintaining the support feet adjacent the edges of the vehicle roof and, additionally, there is no provision for automatically controlling the maximum tension between the rack and the vehicle roof.

The patent to Barreca illustrates a form of constant length support bar wherein the relative tensioning between the rack and the roof is simply adjusted by a crank assembly. Barreca's device does not provide for a support mechanism of varying lengths so that the support feet are maintained adjacent the edge of the vehicle roof, with the additional provision of an automatic tensioning means to absolutely limit the maximum tension which may be applied upon the vehicle roof itself.

The patent to Gallagher employs a constant length support bar which is conventionally attached to a vehicle roof, through straps. Gallagher includes a cranking means for engaging a load superposed upon the support, but is without provision for automatically tensioning the car top carrier onto the roof itself. Finally the patent to Strauss illustrates a turnbuckle arrangement for tensioning a roof mounted accessory onto a vehicle roof. Straus does not provide a pair of telescoping support tubes within one continuous load support, nor does he have the additional feature of automatic means to limit contractive forces exerted upon the vehicle roof.

BRIEF SUMMARY OF THE INVENTION

The present invention is an adjustable car top carrier support device, which is operable for use on either a gutterless or a conventionally guttered car top, requiring only that the roof conventionally has ledges on opposite sides thereof.

According to both embodiments, there is a first horizontal support tube having an outer end and an inner end, and including a first vertical support leg means proximate the outer end. In like fashion there is a second horizontal support tube, having an outer and an inner end, which also includes a second vertical support leg means proximate its outer end. Interconnecting the support tube is a crankshaft means which is operable for horizontally contracting and extending the respective support tubes, to thereby telescope the respective vertical support legs, with respect to a horizontal carrier track.

Significantly, the present invention may include a clutch means in the crankshaft structure, in order to limit the amount of torque which may be applied by the crankshaft in contracting the respective support tubes. The clutch means ensures that only a pre-determined limit of force may be applied between the carrier and the vehicle roof, thus ensuring secure mounting on a vehicle roof, without danger of buckling the sheet metal forming the roof.

In order to ensure that the vertical support legs engage the strongest part of the vehicle roof, the invention critically includes car top engaging means, extending from the bottom of end-mounted vertical support legs. The car top engaging means allows for contractive force application both by mounting hooks and car top engaging pads in the vicinity of the opposite car top ledges. Upon contraction of the support tubes, through turning the crankshaft, the amount of engagement force which is exerted between the foot pads and the associated hooks which extend downwardly, and outwardly, to engage the opposite ledges of the car top, may also be limited by a clutch means.

Because the car top engaging means includes a pivotable foot which is itself contracted by the operation of the crankshaft, the force applied by the pivotable foot pads will be shared between the pad and the car top ledge hook, since both are connected to a contracting vertical leg. The car top hook may directly be connected to the pivotable foot pad, or the car top hook may be fixed upon the vertical leg itself.

According to the preferred embodiments the present invention provides for the contractible support tubes to be slidable within an encompassing horizontal carrier track. The carrier track functions to allow a mounting surface for any form of superposed devices, such as a carrier container, and also completely encloses the crank mechanism against environmental hazards. A clutch mechanism itself is illustrated, in a preferred embodiment, to include a first clutch jaw which is rigidly connected at its outer end to a crankshaft which extends within the first support tube. At the outer end of one support tube is a crank handle, and proximate its inner end the first clutch member is attached to the handle via the crankshaft. At the inner end of the first clutch jaw is a preferred form of clutch surface, which is illustrated to be a spiral clutch face vertically disposed on the inner end of the first clutch jaw. A mating, and corresponding vertically disposed spiral clutch surface is then taught to be rigidly connected at its outer end with a screw shaft that extends within the second support tube, through an associated mating female nut affixed to the second support tube.

According to the preferred embodiment, the spiral clutch surfaces are urged together by a novel clutch torque adjusting means, so that the amount of torque which may be transmitted from the first to the second clutch jaw can be pre-determined to thusly limit the amount of contractive force exerted by the car top engaging means when the support tubes are contracted.

A further advantage of the present invention is the provision of a crank handle which is itself pivotable around the crankshaft extending through the outer end of a first support tube. On the first vertical support leg, extending downwardly from the outer end of the first support tube, may further be provided an aperture including a spring means to allow the secure lodgement of the crank handle, when not in use.

An object of the present invention is the provision for a car top carrier support mechanism which will ensure accurate and secure mounting, without requiring involved adjustments by the user.

A further object of the present invention is a car top carrier support mechanism which will ensure positioning of the car top engaging means proximate the strongest part of the car top, to wit, the vicinity of the opposite edges of the vehicle roof.

A still further object and advantage of the present invention is a car top carrier which is adjustable for a pre-selected contraction, and is thereafter enclosed against tampering by an encompassing carrier track.

A still further object and advantage of the present invention is a car top carrier and support which is particularly easy to apply, even by the most inexperienced persons, and one which will be automatically mounted against dislodgement by simply turning a crankshaft handle.

Other advantages of the present invention will become more apparent from the detailed description which follows, wherein reference is made to the accompanying drawings.

BRIEF DESCRIPTION OF THE DRAWINGS

FIG. 3 is a partial section view illustrating the details of a preferred clutch and adjustment mechanism;

FIGS. 4 and 5 are section views of FIG. 3;

FIG. 10 illustrates details of the engagement means and handle locking;

FIGS. 11 and 12 illustrate details of one support leg, according to a preferred embodiment.

FIG. 13 is a plan view of a second embodiment of the present invention, illustrating structural components in a partial cross-section;

FIG. 14 is sectional view of the embodiment of FIG. 13;

FIG. 15 is a sectional view on the support tube of the embodiment of FIG. 13;

DESCRIPTION OF THE PREFERRED EMBODIMENTS

Figure 1:
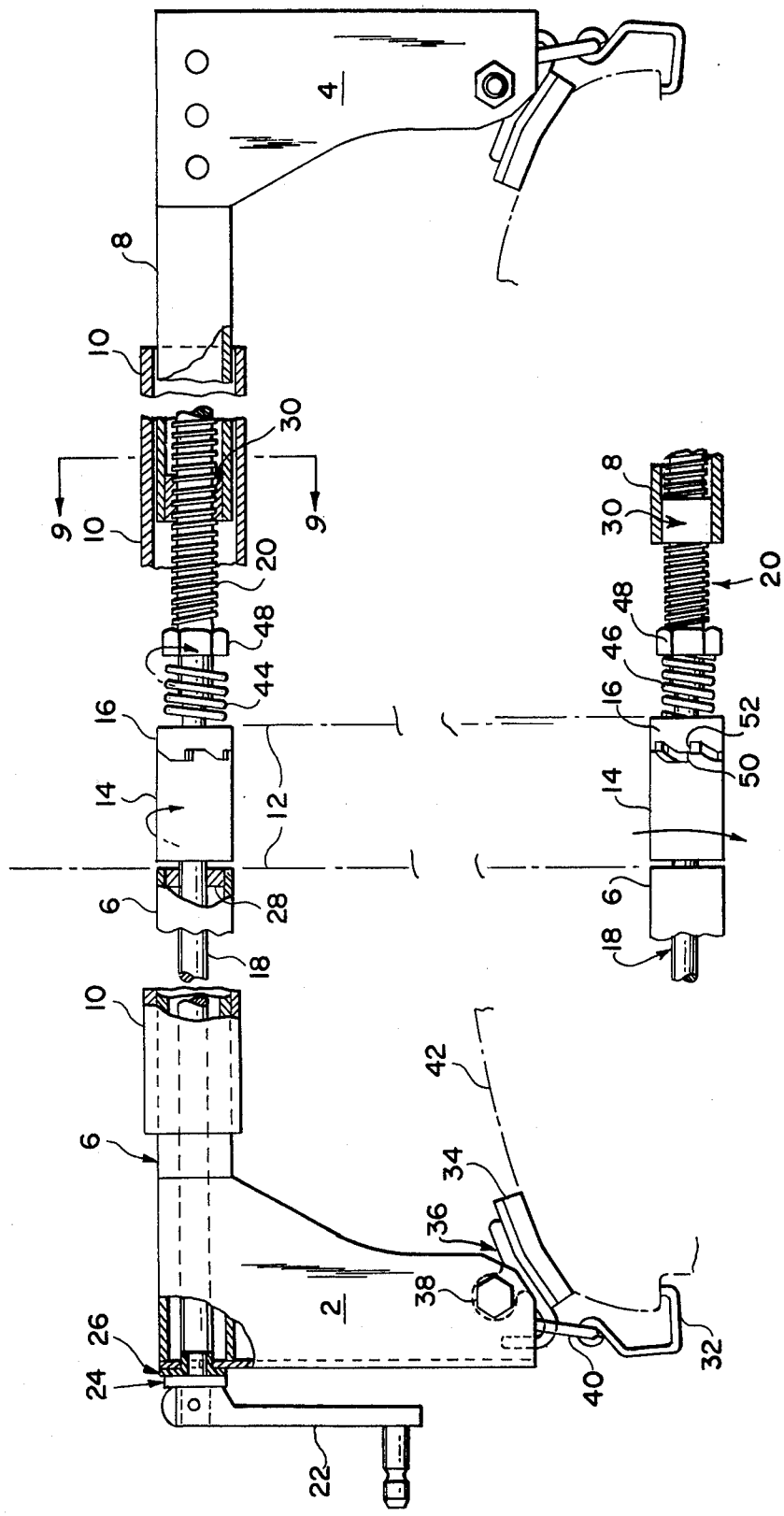
FIG. 1 is a plan view of a preferred embodiment of the present invention, illustrating structural components in partial cross-section.

A preferred embodiment of an adjustable car top carrier support according to the present invention is illustrated in plan view at FIG. 1. With reference to FIG. 1, the car top carrier support is illustrated to be operable for mounting upon a gutterless car top, for illustrative purposes only. The preferred embodiment essentially comprises a first horizontal support tube 6 and a second horizontal support tube 8. At the outer end of the first horizontal support tube 6 is a first support leg 2 which extends substantially vertically downward, and is rigidly affixed to the first support tube 6. Similarly, at the outer end of the second support tube 8 is a second support leg 4, also rigidly affixed to the outer end of the second support tube.

In the preferred embodiment of FIG. 1, horizontally adjustable support tubes 6 and 8 are operably contracted by a crankshaft means which interconnects the support tubes in a fashion which will now be more particularly described. The crankshaft means comprises a crankshaft 18 which is horizontally disposed within the first support tube 6. Proximate the outer end of the first support tube is a crank handle 22 which is rigidly connected to a first clutch jaw 14 through the rotatably disposed crankshaft 18. At the inner end of the first support tube is held a crankshaft support 28, which may comprise any form of bearing, for example a plastic bushing. The first clutch jaw 14 includes, in a preferred embodiment, a vertically disposed spiral clutch face that is operable for mating engagement with a corresponding spiral clutch face on a second cluth jaw member, 16. The second clutch jaw is adjustably rotatable with respect to the first clutch jaw 14, and the second clutch jaw 16 is rigidly connected to a longitudinally threaded screw 20 for transmitting contractive, and expansive, relative motion between the respective first and second supports, 6 and 8. The longitudinally threaded screw 20 may be of the acme type, and is inserted into the screw shaft nut 30, which is rigidly affixed within the second support tube 8.

Each of the vertical support legs, 2 and 4, are symmetrical, and the operation of the left support leg 2 will now be discussed, with the understanding that the symmetrical operation is intended for the right support leg 4. The first support leg 2 includes a car top engaging means, extending from the bottom of the vertical support leg. The car top engaging means is a composite structure, and consists of a pivotable foot 36 secured between opposite sides of a channel formed within the support leg 2. The pivotable foot 36 is held within the channel structure of the support leg 2 by a bolt 38 so that the car top hook 32 will be outwardly and downwardly disposed from the foot pad 34. The car top hook 32 is connected, through a D-ring 40, to apply a counterclockwise moment about the pivot bolt 38 as the foot pad 34 is contracted inwardly upon the car top 42.

Figure 2:
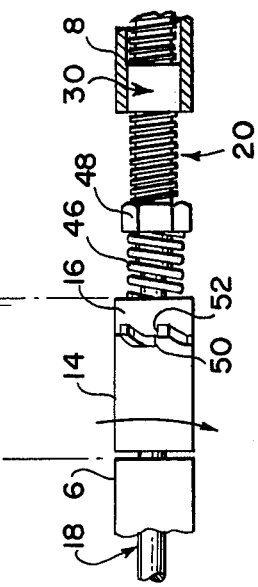
FIG. 2 is a section view showing a preferred clutch mechanism in the preferred embodiment.

The automatically adjustable clutch mechanism is shown in position 12 at FIG. 1, and position 12 represents the application of a torque, from handle 22, that is less than a pre-determined level. As shown in FIG. 2, the application of a torque, directly to first clutch member 14, has exceeded a pre-determined level so that the spiral clutch surface 50 has begun to move relative to the spiral clutch surface 52 of the second jaw clutch member 16. The pre-selection of this automatic level of maximum torque is controlled by a compression spring, which is shown in its uncompressed position at 44, in FIG. 1, and in a compressed position at 46 at FIG. 2. The pre-load on the compression spring 44 is controlled by an adjustment nut 48 to any desired value. For a further understanding of the novel clutch mechanism taught according to a preferred embodiment, further reference may be made to FIG. 3. As shown in FIG. 3, the first support tube 6 includes the inwardly disposed crankshaft 18 being supported by the crankshaft bearing 28 at the inward end of the first horizontal support tube 6. The crankshaft 18 extends inwardly from the inner end of the first support tube and is pinned, or otherwise secured, at 54, within the first cylindrical clutch jaw 14. According to the preferred embodiment of FIG. 3, the first and the second clutch jaws are horizontally disposed, right circular cylinders, and there is a hollow within first clutch jaw 14 to accommodate a clutch shaft lock nut 62. The preferred embodiment for a torque limiting means thereby comprises a pair of cylindrical clutch jaws, 14 and 16, that are adjustable for any preselected level of torque transmission from the first clutch jaw 14, to the second clutch jaw 16. For this purpose there is provided a clutch shaft 60 that includes a threaded portion 64 applicable for mating with adjustable compression nut 48. The compression spring 44 engages against the relatively outer surface of the second clutch jaw 16, with the amount of compression simply controlled by adjusting the compression nut 48 upon the threaded portion 64 of the clutch shaft 60. Within a first clutch jaw 14, the preferred embodiment includes a crankshaft mounting collar 56 for locating the fixation of the crankshaft 18 by, for example, a pin at 54. Within the hollow first clutch jaw 14, the inner end of the clutch shaft 60 is held by a clutch shaft lock nut 62, that is spaced from the inner surface of the first clutch jaw 14 by a thrust bearing 58. The centerline illustrated in FIG. 3 represents the centerline of rotation of the entire crankshaft means, and the section line 4'—4' within the first clutch jaw 14 is further illustrated in FIG. 4. The clutch shaft 60 is of a semi-circular configuration at section 5'—5', so that the clutch shaft 60 is fixed within a corresponding D-shaped female configuration, as shown in FIG. 5. The clutch shaft 60, at its relatively outer end, is rigidly held within the screw 20 by inserting a sub-shaft portion 66 within the screw 20, and rigidly affixing the assemblies, such as by a pin at 68.

Figure 6:
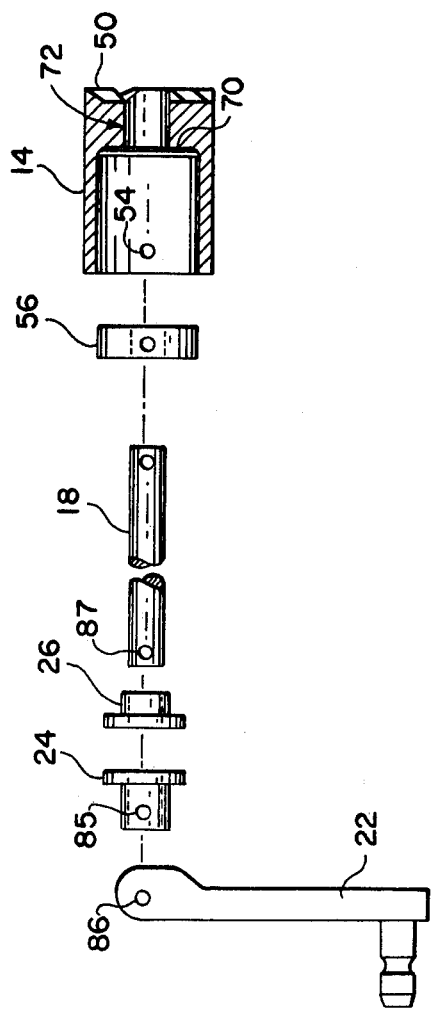
FIG. 6 is a detailed drawing of a crankshaft interconnection with part of the preferred clutch mechanism.

FIG. 6 illustrates, in explosion view, the functional interconnection between the crank handle 22 and the first clutch member 14. The crankshaft 18 is rotatably held within a thrust bushing 26, with the thrust bushing 26 being positioned as shown in FIG. 1. Outwardly adjacent the thrust bushing 26 is a thrust collar 24, having an aperture at 85 which will be in registration with a corresponding aperture 87 at the outer end of the crankshaft 18. The crank handle 22 is slipped over the aperture 85 in the thrust collar 24 so that a pin may be extended through the aperture 86 and into the registration of apertures 85 and 87. Consequently, the crank handle 22 is operable to impart a rotative torque on the crankshaft 18, while also being pivotable about the pivot pin at 86. As further illustrated in FIG. 6, the inner end of the first clutch jaw 14 includes an access passage, or clearance hole, 72, which will not engage the semi-circular section of the clutch shaft 60, as further shown in FIG. 4. The cylindrical first clutch jaw 14 includes an inner step surface 70 which provides for an annular bearing surface against which the thrust bearing 58 is positioned.

Figure 7:
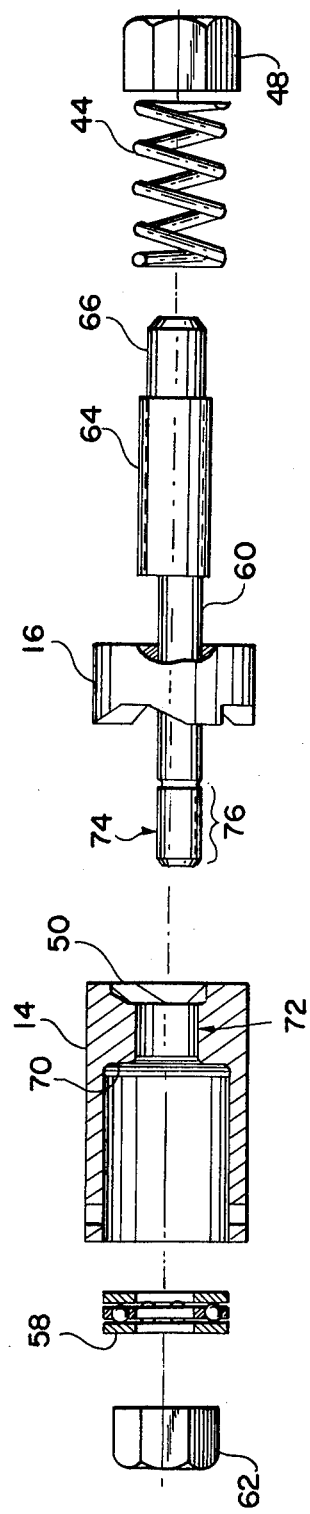
FIG. 7 is an exploded view showing a preferred clutch adjustment mechanism.

Details of the adjustable clutch mechanism according to a preferred embodiment are further illustrated in FIG. 7. The clutch shaft 60 includes a threaded portion 76 that extends around the semi-circular portion of the clutch shaft. As shown in FIG. 7 the semi-circular configuration is defined with a flat surface 74, shown upwardly disposed. The second clutch jaw member 16 will be keyed onto the clutch shaft 60 by the engagement illustrated in FIG. 5, while the flat surface 74 will be free to rotate within the clearance hole 72 of the first clutch jaw 14. It can be appreciated that the assembly of the novel clutch means herein is particularly facilitated by the arrangement shown in FIG. 7, simply requiring that the shaft end 76 be inserted through the clearance hole 72, with the thrust bearing 58 held against the shoulder 70 by the clutch shaft lock nut 62. With reference to FIG. 7, spring 44 is slipped over the right end of the clutch shaft 60, and the compression adjustment nut 48 threaded inwardly upon the threaded portion at 64. Thus assembled, the clutch may be pinned, at its left end, to the crankshaft 18. The sub shaft 66 may then be pinned into screw 20, as by pin 68.

Figure 8:
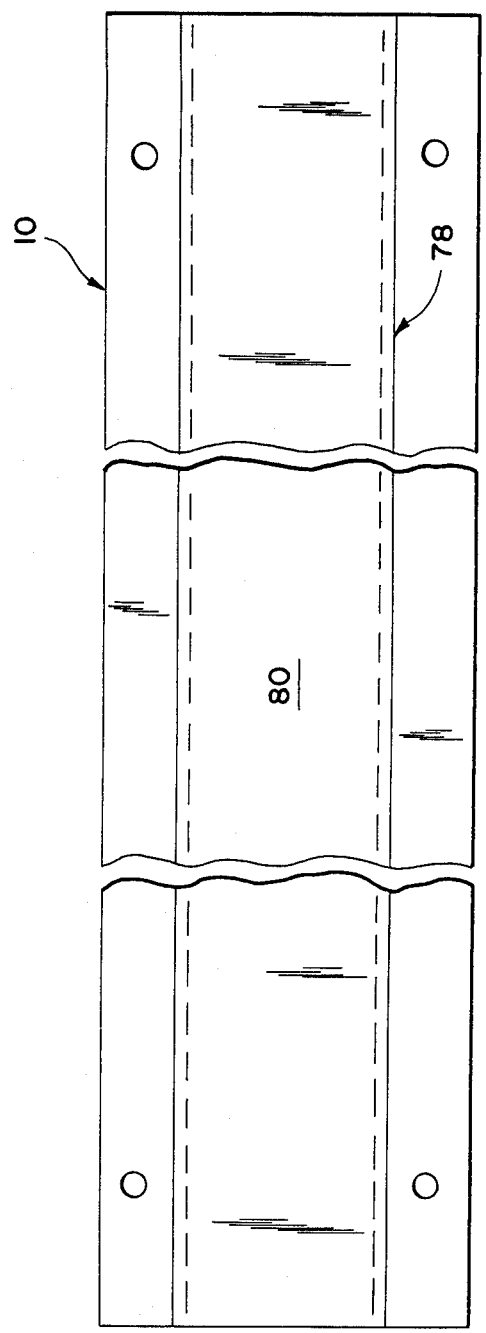
FIG. 8 is a bottom view of a preferred carrier track.
Figure 9:
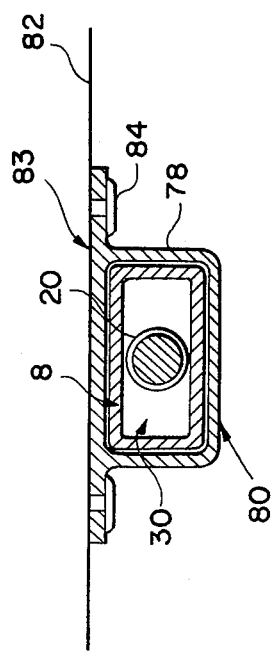
FIG. 9 is a section view showing a carrier interconnected with the carrier track.

FIG. 8 illustrates, in bottom view, a rectangular carrier track which is particularly advantageous according to the preferred embodiment. As shown in FIG. 9, the carrier track is a rectangular tube having a bottom surface at 80 and an upper flange at 83. FIG. 9, is a section view, along line 9—9 in FIG. 1, and illustrates the support tube 8 in the carrier track. The outer configuration of the support tube 8 is slideable within the inner rectangular configuration of the carrier track 10, so that the superposed carrier may be freely moved in a relative horizontal direction. According to the preferred embodiment, the carrier track is a one-piece extrusion of aluminum, for example, and has vertical legs 78 and a flange surface at 83. Within the flange 83 may be provided a fastener, shown at 84, for securing a superposed carrier, as indicated at 82, onto the upper flange surface of the carrier track. The clearance between the outer configuration of the support tube 8, and the inner configuration of the carrier track 10, is sufficient only to allow a horizontal sliding of the carrier track on the support tubes. However, when the carrier, such as 82, is loaded in use there will be a slight curvature imposed to the support tubes 6 and 8. Since the support tubes 6 and 8 are supported only at their outer ends, an evenly distributed load upon this end-supported horizontal span will tend to impart a slight sag to the center portions of the respective support tubes 6 and 8. Consequently, free movement of the carrier track 10, relative to support tubes 6, 8, will be resisted when the carrier is actually loaded and in operation. Therefore, while the carrier track 10 may be slid horizontally when empty, when the superposed carrier 82 is loaded, by any form of externally carried articles, there will be a camming effect between the carrier track and the support tubes to preclude further horizontal movement of the carrier relative to the support tube. It should be appreciated that the slight buckle of the support tubes allows for the superposed carrier 82 to be positioned at any desired horizontal position on the car top, and it will remain in that position after the user has loaded the carrier.

FIG. 12 illustrates the rigid interconnection between the outer end of the left support tube and the channel member comprising the first vertical support leg. The vertical leg 2 may be fastened to support tube 6 by fasteners 96, to supply a rigid assembly. The inwardly opening channel member 2, according to the preferred embodiment, is further illustrated at FIG. 11 to include an aperture 88, together with two spring clips, 90, that are oppositely spaced inside the inwardly open channel. The spring clips 90 function to allow the nesting of a detent on a normally extending hand grip portion of the handle 22. Since the handle 22 is pivotable around the pivot pin 86, the normally extending hand grip portion of the handle 22 may be finally pivoted around 86 so that the detent 89 engages between the spring clips 90. In operation, the handle 22 is turned to contract the second support tube 8, relative to the first support tube 6. After exerting the maximum amount of torque which may be transmitted through the clutch means 12, the crank handle 22 can still be further rotated, while slipping the clutch, until the normally extending hand grip portion is vertically upwards. Since the pivot pin 86 is at the proximate end of the handle, and the detent is part of a normally extending hand grip portion at the distal end of the crank handle 22, the crank handle 22 can then be pivoted downwardly about pivot 86 and easily lodged between the springs, 90. If, for example, the contractive force exerted by the crankshaft means is applied upon a clockwise motion of crank handle 22, the user will be freely able to further rotate the handle in further clockwise motion after the maximum amount of torque has been transmitted through the clutch means 12. A reassuring click will be heard by the user, and no further contractive forces will be applied by the car top engaging means after the maximum pre-selected torque has been exceeded between the first and second clutch jaws.

As further shown in FIG. 10, the foot assembly 36 may include a foot pad mounting plate 94 to allow for simple replacement of the resilient foot pad 34. The pivotable foot 36 further includes, according to this preferred embodiment, a flange 92 which extends upwardly within, and proximate the bottom, of the channel which comprises each vertical support leg. With the D-ring 40 thusly slipped over the extending flange 92, the foot 36 will be limited, in its counterclockwise rotation, by the contact of the flange 92 against the inner wall of the vertical support leg channel.

As each vertical support leg is contracted against a car top, as shown in FIG. 1, the engaging means tensions both hook 32 and mounting pad 34 in a force distributing manner. As further contractive force is applied between a foot pad 34 and a car top, the car top hook 32 will ensure that the outer portion of the foot pad 34 also is maintained in contact with the car top. Additionally, the present invention provides that the pad 34 may not be mounted outside the vicinity of the ledges, commonly found on opposite sides of any car top, so that the strongest part of the car top is used for supporting the contractive force, and the load, of the carrier.

Hence, the present invention provides a car top carrier support which ensures utmost ease of installation, and maximum security for the entire assembly. The user cannot apply more than a predetermined compressive force between the carrier and the roof top, since continuous contractive rotation of the handle 22, will immediately extend the respective support tubes, thus facilitating quick removal of the device. The user will further be unable to improperly position the car top engaging means on a weakened portion of the sheet metal comprising the car top, since the car top ledge hook 32 is maintained proximate the bottom of the support leg 2 by only a D-ring connection, shown at 40. A further advantage of the preferred embodiment is the provision of the pivotable crank handle 22 which may be continually rotated, in the compressive direction, while only slipping the clutch, and finally pivoted about the crank shaft 18 so that the detents 89 are held firmly by the spring clip 90.

With the present invention used as a support for a superposed carrier, it has been found that two horizontally disposed assemblies conveniently supply adequate rigidity upon any car top configuration. It should be understood that the nature of the superposed article carrier, shown at 82 in FIG. 9, forms no part of the present invention and the present carrier support is useful in any number of automotive applications.

A second embodiment of an adjustable car top carrier support according to the present invention is illustrated in plan view at FIG. 13. With reference to FIG. 13, a car top carrier support is illustrated to be operable for mounting upon a gutterless car top, for illustrative purposes only. This second embodiment also essentially comprises a first horizontal support tube 106 and a second horizontal support tube 108. At the outer end of the first horizontal support tube 106 is a first support leg 102 which extends substantially vertically downward, and is rigidly affixed to the first support tube 106. Similarly, at the outer end of the second support tube 108 is a second support leg 104, also rigidly affixed to the outer end of the second support tube.

In the embodiment of FIG. 13, the horizontally adjustable support tubes 106 and 108 are operably contracted by a crankshaft means which interconnects the support tubes in a fashion which will now be more particularly described. The crankshaft means comprises a crankshaft 118 which is horizontally disposed within the first support tube 106. Proximate the outer end of the first support tube is a crank handle 122 which is rigidly connected to a horizontally disposed screw shaft, 120. At the inner end of the first support tube 106 is held a crankshaft support 128, which may comprise any form of bearing, for example a bushing formed of a plastic such as polyethylene, as shown in FIG. 14. Hence, rotation of the longitudinally threaded screw 120 transmits contractive, and expansive relative motion between the respective first and second supports, 106 and 108. The longitudinally threaded screw 120 may be of the acme type, and is inserted into the screw shaft nut 130 which is rigidly affixed within the second support tube, as by pan-head machine screws, 131, as shown in FIG. 15.

The vertical support legs 102 and 104 are symmetrical, and the operation of the left support leg 102 will now be discussed, with the understanding that the symmetrical operation is intended for the right support leg. The first support leg 102 includes a car top engaging means, extending from the bottom of the vertical support leg. The second embodiment for a car top engaging means is also a composite structure, and consists of a pivotable foot secured between opposite sides of a channel formed within the support leg 102 by a bolt 138, and car top hook 142 is also mounted on leg 102 so as to be outwardly and downwardly disposed from the foot pad 134. The car top hook 142 is connected, through a D-ring 140 and mounting bracket 112, to apply a counterclockwise moment directed to the support leg 102 as the foot pad 134 is contracted inwardly upon the car top 144.

As shown in FIG. 13, the second support tube 108 includes an outwardly disposed screw shaft support, 132, and support 132 is freely slideable within the rectangular tubing defining support tube 108. The screw shaft support 132 may be of any bushing material, and may be a plastic such as polyethylene.

FIG. 13 also illustrates the functional interconnection between the crank handle 122 and the crankshaft 118. The crankshaft 118 is slideably positioned through a thrust bushing 126. At the outer end of the thrust bearing 126 is a thrust collar 124 having an aperture which will be in registration with a corresponding aperture at the outer end of the crankshaft 118. The crank handle 122 is slipped over the aperture in the thrust collar 124, so that a pin may be extended through the registration of apertures. Consequently, the crank handle 122 is operable to impart a rotative torque on the crankshaft 118, while also being pivotable about its pivot pin in a fashion equivalent to the embodiment of FIG. 1. As further illustrated in FIG. 13, the inner end of the normally extending portion, or hand-grip portion, of the crank 122 also includes an annular detent.

A rectangular carrier track, as illustrated in FIGS. 8 and 9, is also particularly advantageous for use within this second embodiment. As shown in FIG. 13, carrier track 110 is a rectangular tube having a bottom surface, and an upper flange. FIG. 14 is a section view, of FIG. 13, and illustrates first support tube telescopically positioned within the carrier track. The outer configuration of second support tube 108 is also slideable within the inner rectangular configuration of the carrier track 110, since the pan-head screws 129 and 131 are recessed into the respective support tubes. As in the preferred embodiment of FIG. 1, the carrier track may be a one-piece extrusion, of aluminum, for example, and includes a flanged upper surface for either directly supporting a load or for mounting to a superposed carrier structure. The clearance between the outer configuration of each support tube, and the inner configuration of the carrier track, is sufficient only to allow a horizontal sliding of the carrier track upon the support tubes. However, when a load is imposed upon the upper surface of the carrier track there will be a slight curvature imposed upon the support tubes 106 and 108. Since support tubes 106 and 108 are supported only at their outer ends, an evenly distributed load upon this end-supported horizontal span will tend to impart a slight sag to the center portions of the support tubes, hence, free movement of the carrier track, relative to the support tubes, will be resisted when the carrier is actually loaded as intended. Therefore, while the carrier track may be slid horizontally when empty, a load will cause a camming effect between the carrier track and the support tubes, to preclude further horizontal movement of the carrier relative to the support tube. It should be appreciated that this embodiment also allows an initial positioning of the carrier track at any desired horizontal position on the car top, and the track will thereafter remain in that position after the user has loaded the carrier.

Figure 17:
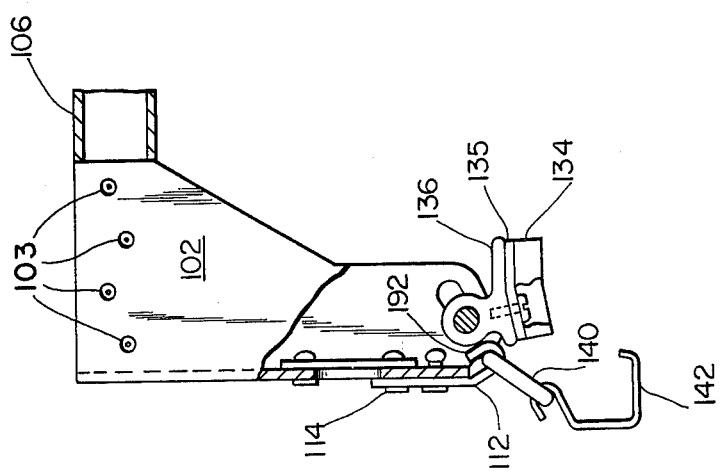

FIG. 17 illustrates the rigid interconnection, between the outer end of the first support tube 106 and the channel member comprising the first vertical support leg 102. Blind rivets 103, may be disposed, as shown in FIG. 17, to ensure a rigid assembly. The inwardly opening channel member 102, according to the second embodiment, is further illustrated at FIGS. 16–18 to include an aperture 188, together with a resilient plate, 190, which are configured to act as a spring catch upon the detent of handle 122, in a fashion analogous to the spring clips illustrated in FIG. 10. As in the torque-limiting embodiment of FIG. 1, the crank handle is rotated to contract the second support tube relative to the first support tube. After exerting a desired amount of torque, the crank handle 122 may be further rotated, if necessary, to pivot the extending hand grip portion to a vertically upward position. The detent, being part of the normally extending hand grip portion at the distal end of the crank handle, can then be pivoted downwardly and lodged within the aperture 188, to be held by the opening in the resilient spring plate, 190.

While further contractive forces may therefore be applied by the car top engaging means, upon moving the handle to a vertically upright position, the fact that the car top engaging means is necessarily proximate the strongest part of any vehicle roof mitigates against the possibility of locally deforming the roof sheet metal. Of course, the application of a horizontal contractive force by the crankshaft, located within the hollow support tubes, allows relief of excessive contractive forces by bending flexure of the tubes, themselves. The foot pad is held simply by bolt 138, hence, contractive forces exerted on leg 102 will not function to transmit a bending moment to the foot pad. It should be emphasized that the present invention ensures that hook 142 and the foot pad 134 will work together to distribute mounting forces only in the immediate vicinity of the edges of a car top, since both are connected to a telescoping support tube at the bottom of the vertical leg structure.

Figure 18:
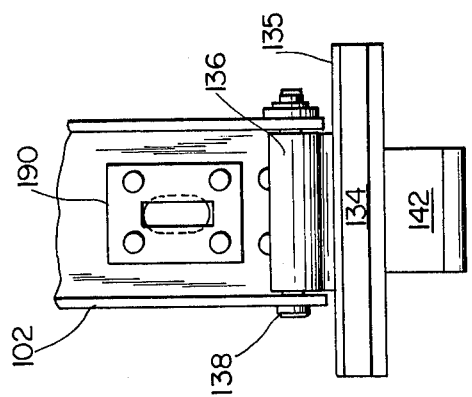
FIGS. 16–18 illustrate details of one support leg, according to a second embodiment.
Figure 16:
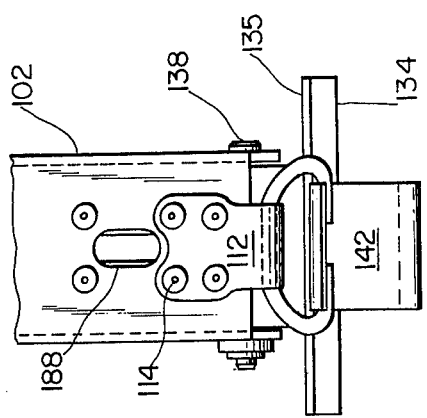

As further shown in FIGS. 16–18, the foot assembly 136 may include a foot pad mounting plate 135 to allow for simple replacement of the resilient foot pad 134. The mounting bracket 112 further includes, according to this second embodiment, a flange 192 which extends upwardly within, and proximate the bottom, of the channel which comprises each vertical support leg. With the D-ring 140 thusly slipped over the extending flange 192, the foot pad 134 will be urged downwardly, since the D-ring is incapable of exerting bending moment directly upon the foot pad which is pivotatable about bolt 138.

As each vertical support leg is contracted against a car top, as shown in FIG. 13, the engaging means tensions both hook 142 and mounting pad 134 in a force distributing manner. As further contractive force is applied between a foot pad 134 and a car top, the car top hook 142 will ensure that the concave bottom surface of foot pad 134 is maintained in conforming contact with the car top. Hence, this second embodiment of the present invention also provides that the foot pad cannot be mounted outside the vicinity of the ledges, commonly found on opposite sides of any car top, so that the strongest part of the car top is used for supporting the contractive force, and the load, of the carrier. In either embodiment, the support tubes themselves are telescoped within a surrounding carrier track, with the synergistic result that any form of load applied to the upper surface of the carrier track will simply add to a slight buckling of the tubes within the carrier track, thusly further camming the carrier track into its final orientation vis-a-vis the vehicle roof.

From the foregoing, various other features, advantages, objectives, adaptions and rearrangements of the disclosed adjustable car top carrier, and adjustable car top carrier support, will be apparent to those skilled in the art. However, it is understood that the invention is to be solely limited by the scope of the appended claims.

We claim:

1. An adjustable car top carrier support, operable for use on a gutterless car top having ledges at opposite sides thereof, comprising:
   a. a first horizontal support tube, having an outer and an inner end, and including a first vertical support leg means proximate said outer end;
   b. a second horizontal support tube, having an outer and an inner end, and including a second vertical support leg means proximate said outer end;
   c. crankshaft means interconnecting said support tubes for horizontally contracting and extending said respective support tubes;
   d. clutch means within said crankshaft means for limiting the amount of torque which may be applied by said crankshaft in contracting said support tubes; and
   e. car top engaging means, extending from the bottom of each of said vertical support leg means, and operable for engaging a car top proximate said ledges at opposite sides of said car top, whereby upon contraction of said support tubes engagement forces are transmitted to said car top only in the vicinity of said opposite car top ledges and said clutch means is operable to limit the amount of the engagement force which may be exerted between said car top carrier and a car top.

2. An adjustable car top support according to claim 1, wherein said car top engaging means further comprises a foot pad assembly further comprising a pivotable foot, having a downwardly disposed foot pad, and a car top hook, outwardly and downwardly disposed from said foot pad and thereby operable for engaging the ledge at either opposite side of a gutterless car top.

3. An adjustable car top support according to claim 2, wherein said crankshaft means further comprises a crank handle, proximate said outer end of said first horizontal support tube, and connected to said clutch means through a horizontally disposed crankshaft.

4. An adjustable car top support according to claim 3, wherein said clutch means includes a first clutch jaw, rigidly connected said crankshaft, and a second clutch jaw adjustably rotatable with respect to said first clutch jaw.

5. An adjustable car top support according to claim 4, wherein said crankshaft means further includes a clutch shaft means, rigidly mounted to said second clutch jaw, and rotatably mounted with respect to said first clutch jaw, said clutch shaft means being rigidly mounted to a screw means within said second support tube and further being operable for transmitting a torque from said first to said second clutch jaws.

6. An adjustable car top support according to claim 2, wherein each of said vertical support legs comprises an inwardly opening channel member, and said pivotable foot is mounted around a mounting bolt extending between opposite sides of said open channel, wherein said car top hook is suspended from a D-ring hooked around a flange of said pivotable foot that extends upwardly within, and proximate the bottom, of said channel, wherein the flange is outward of said mounting bolt.

7. An adjustable car top support according to claim 1, wherein said crankshaft means further comprises a crank handle, proximate said outer end of said first horizontal support tube, and connected to said clutch means through a horizontally disposed crankshaft.

8. An adjustable car top carrier according to claim 7, wherein said clutch means includes a first clutch jaw, rigidly connected to said crankshaft, and a second clutch jaw adjustably rotatable with respect to said first clutch jaw.

9. An adjustable car top support according to claim 8 wherein said crank shaft means further includes a clutch shaft means which is rigidly mounted to said second clutch jaw and rotatably mounted with respect to said first clutch jaw, said clutch shaft means being rigidly mounted to a screw means within said second support tube and further being operable for transmitting a torque from said first to said second clutch jaws.

10. An adjustable car top support according to claim 9 wherein said screw means comprises a horizontally disposed, threaded screw shaft engaging a screw shaft nut proximate, and fixed within, the inner end of said second support tube.

11. An adjustable car top support according to claim 10, wherein said crankshaft is rotatably supported within said first support tube and said clutch means is disposed between the respective inner ends of said first and second support tubes.

12. An adjustable car top support according to claim 7 wherein said crankshaft is rotatably supported within said first support tube and said clutch means is disposed between the respective inner ends of said first and second support tubes.

13. An adjustable car top support according to claim 12, wherein said first clutch jaw comprises a horizontally disposed cylindrical member having a vertically disposed spiral clutch surface at its inner end, and said second clutch jaw comprises a horizontally disposed spiral clutch surface at its inner end, said clutch surfaces being urged together by a clutch torque adjustment means which is operable to allow said first clutch jaw to transmit only a pre-determined level of torque to said second clutch jaw when said crankshaft is rotated to contract said support tubes.

14. An adjustable car top support according to claim 13 wherein said clutch torque adjustment means comprises a nut for adjustably urging a compression spring around said clutch shaft, against the outer end of said second clutch jaw, and a thrust bearing and nut on said clutch shaft within said first clutch jaw.

15. An adjustable car top support according to claim 7, wherein said first vertical support leg includes a vertical outer surface with an aperture therein, between said support tube and said car top engaging means, said aperture further including spring means, wherein further said crank handle is pivotably mounted, at a proximate end, upon said crankshaft and includes, at its distal end, a normally extending hand grip portion that includes a detent, whereby upon exerting the maximum amount of torque through said clutch means said crank handle can be further rotated, while slipping said clutch, and pivoted about said crankshaft for insertion of said detent and past said spring means.

16. An adjustable car top support according to claim 1, wherein said first and second support tubes are mounted, in a horizontally slideable fashion, within a carrier track, said carrier track having an upper surface adapted for support of the bottom surface of a superposed load.

17. An adjustable car top support according to claim 16, further including a pair of parallel carrier tracks, in combination with a pair of first and second support tubes, whereby said each pair of support tubes are individually operable for mounting and supporting a superposed load upon a car top.

18. An adjustable car top carrier, operable for use on a car top having ledges at opposite sides thereof, comprising:
A. a carrier container having a bottom surface attached to the top surface of at least one horizontally disposed carrier track;
B. a pair of support members slideably positioned within said track, each support member having an outer end and an inner end;
C. vertical support legs extending downwardly from each of said respective support members, and including car top engaging means, at the bottom of said each support legs, operable for engaging a car top proximate said ledges at opposite sides of said car top; and
D. means to contract and extend the opposed inner ends of said support members, said means further including torque limiting means to limit the amount of contractive engagement force which may be exerted by said car top engaging means against a car top.

19. An adjustable car top carrier according to claim 18, wherein said means to contract said support members comprises a crankshaft freely rotatable and extending within a first support member from a crank handle, at the outer and of said first support to a clutch inwardly from the inner end of said first support, and a threaded screw extending from said clutch to a mating nut fixed within the second support member.

20. An adjustable car top carrier according to claim 19 wherein said clutch means includes a first clutch jaw, rigidly connected at its outer end to said crankshaft and including a vertically disposed spiral clutch surface at its inner end, a second clutch jaw, rigidly connected to said threaded screw at its outer end, and including a vertically disposed mating spiral clutch surface at its inner end, said clutch surfaces being urged together by a clutch torque adjustment means operable to allow said first clutch jaw to transmit only a pre-determined level of torque to said second clutch jaw when said crank handle is rotated to contract said support members.

21. An adjustable car top carrier support, operable for use on a gutterless car top having ledges at opposite sides thereof, comprising:
A. a first horizontal support tube, having an outer and an inner end, and including a first vertical leg means proximate said outer end;
B. a second horizontal support tube, having an outer and an inner end, and including a second vertical support leg means proximate said outer end;
C. crankshaft means interconnecting said support tubes for horizontally contracting and extending said respective support tubes;
D. a carrier track, within which said first and second support tubes are mounted, in a horizontally slideable fashion, with their respective inner ends horizontally opposed, said carrier track having an upper surface adapted for support of the bottom surface of a superposed load;
E. car top engaging means, extending from the bottom of each of said vertical support leg means, and operable for respective engagements with said opposite car top ledges, whereby upon contraction of said support tubes in a telescoping fashion into said carrier track, engagement forces will be transmitted to said car top only in the vicinity of said opposite car top ledges.

22. An adjustable car top support according to claim 21 wherein said carrier track comprises a rectangular tube, wherein each of said support tubes further comprise a rectangular outer configuration substantially mating with the inner configuration of said rectangular carrier track.

23. An adjustable car top support according to claim 22, further including a pair of parallel carrier tracks, in combination with a pair of first and second support tubes, whereby said each pair of support tubes are individually operable for mounting and supporting a superposed load upon a car top.

24. An adjustable car top support according to claim 22, wherein said each car top engaging means further comprises a foot pad assembly further comprising a pivotable foot, having a downwardly disposed foot pad, and a car top hook, outwardly and downwardly disposed from said foot pad and thereby operable for engaging the ledge at either opposite side of a gutterless car top.

25. An adjustable car top support according to claim 24, wherein each of said vertical support legs comprises an inwardly opening channel member, and said pivotable foot is mounted around a mounting belt extending between opposite sides of said open channel, wherein said car top hook is suspended from a D-ring hooked around a flange extending from the bottom of said vertical support leg wherein said flange is outward of said mounting belt.

26. An adjustable car top support according to claim 22, wherein said crankshaft means further comprises a crank handle, proximate said outer end of said first horizontal support tube, and connected to said second support tube through a crankshaft horizontally disposed within said first support tube, said crankshaft being rigidly engaged at its innermost end to a screw means, horizontally disposed within said second support tube, and adapted to expand and contract said support tubes.

27. An adjustable car top carrier support according to claim 26 wherein said screw means comprises a horizontally disposed, threaded screw shaft engaging a screw shaft nut proximate, and fixed within, the inner end of said second support tube.

28. An adjustable car top support according to claim 27, wherein said crankshaft is rotatably supported within said first support tube, and said screw shaft includes a rotatable end support about its end which is proximate the outer end of said second support tube, said rotatable end support being adapted for horizontal movement within said rectangular second support tube.

29. An adjustable car top support according to claim 27 wherein said rotatable crankshaft support further comprises a bearing block proximate the inner end of said first support tube, and a thrust bushing and thrust collar at the outer end of first support tube, adjacent said crank handle.

30. An adjustable car top support according to claim 26, wherein said first vertical support leg includes a vertical outer surface with an aperture therein, between said support tube and said car top engaging means, said aperture further including spring means, wherein further said crank handle is pivotably mounted, at a proximate end, upon said crankshaft and includes, at its distal end, a normally extending hand grip portion that includes a detent, whereby said crank handle can be pivoted about said crankshaft for insertion of said detent past said spring means.

31. An adjustable car top support according to claim 22 wherein said carrier track comprises an aluminum extrusion, and said support tubes are comprised of aluminum, wherein said substantial mating configuration is sufficiently tight so that upon the application of a load upon said carrier track said support tubes will slightly buckle and become cammed within said carrier track.

* * * * *